United States Patent
Kim et al.

(10) Patent No.: US 9,160,222 B1
(45) Date of Patent: Oct. 13, 2015

(54) APPARATUS WITH POWER GENERATORS DRIVEN BY ELECTRIC MOTORS

(71) Applicant: K-TECHNOLOGY USA, INC., Los Angeles, CA (US)

(72) Inventors: Ki Il Kim, Los Angeles, CA (US); Young Kim, Los Angeles, CA (US); Sarah Duncanson, Toluca Lake, CA (US); Sandra Dyche, Vernon, CA (US)

(73) Assignee: K-TECHNOLOGY USA, INC., Los Angeles, CA (US)

( * ) Notice: Subject to any disclaimer, the term of this patent is extended or adjusted under 35 U.S.C. 154(b) by 0 days.

(21) Appl. No.: 14/473,390

(22) Filed: Aug. 29, 2014

(51) Int. Cl.
| | |
|---|---|
| *H02K 47/00* | (2006.01) |
| *H02K 7/10* | (2006.01) |
| *H02K 51/00* | (2006.01) |
| *H02K 7/20* | (2006.01) |
| *H02K 7/18* | (2006.01) |
| *H02K 53/00* | (2006.01) |

(52) U.S. Cl.
  CPC ............... *H02K 47/00* (2013.01); *H02K 53/00* (2013.01); *Y10S 74/09* (2013.01)

(58) Field of Classification Search
  CPC .............................. B64D 29/00; H02K 53/00
  USPC .......... 310/75 R, 83, 98, 99, 101, 102 R, 112, 310/113, 118, 122; 290/1 A, 1 D, 4 A, 4 C
  See application file for complete search history.

(56) References Cited

U.S. PATENT DOCUMENTS

| | | |
|---|---|---|
| 1,537,071 A | 5/1925 | Farley |
| 1,985,679 A | 12/1934 | Jenkins |
| 2,026,076 A | 12/1935 | Spicer |
| 2,032,112 A | 2/1936 | Brecht |
| 2,053,419 A | 9/1936 | Brecht |
| 2,053,983 A | 9/1936 | Whitsitt |
| 2,624,870 A | 1/1953 | Kolanda et al. |
| 3,556,239 A | 1/1971 | Spahn |
| 3,559,724 A | 2/1971 | Wilkinson |
| 3,575,562 A | 4/1971 | Remke |
| 3,584,214 A | 6/1971 | Peterson |
| 3,608,925 A | 9/1971 | Murphy |
| 3,867,058 A | 2/1975 | Hendrickson |
| 4,021,677 A | 5/1977 | Rosen et al. |
| 4,150,914 A | 4/1979 | Karlsson |
| 4,246,988 A | 1/1981 | Hoppie |
| 4,314,160 A | 2/1982 | Boodman et al. |
| 4,351,405 A | 9/1982 | Fields et al. |
| 4,405,028 A | 9/1983 | Price |
| 4,414,462 A | 11/1983 | Price |

(Continued)

FOREIGN PATENT DOCUMENTS

FR          2657474 A1 *  7/1991

OTHER PUBLICATIONS

Aircraft Ram Air Turbine, Aug. 17, 2012, available online at http://turbinatop.net/aircraft-ram-air-turbine/.

*Primary Examiner* — Dang Le
*Assistant Examiner* — Jose Gonzalez Quinones
(74) *Attorney, Agent, or Firm* — Novick, Kim & Lee, PLLC; Jae Youn Kim

(57) ABSTRACT

Provided is an apparatus including electric power generators. The apparatus includes an electric motor that drives a power generator for generating power that is supplied to rotate another electric motor for driving a plurality of power generators.

10 Claims, 1 Drawing Sheet

(56) References Cited

U.S. PATENT DOCUMENTS

| | | |
|---|---|---|
| 4,433,294 A | 2/1984 | Windebank |
| 4,457,237 A | 7/1984 | Theurer et al. |
| 4,684,817 A | 8/1987 | Goldwater |
| 4,748,338 A | 5/1988 | Boyce |
| 5,179,335 A | 1/1993 | Nor |
| 5,225,763 A | 7/1993 | Krohn et al. |
| 5,296,746 A | 3/1994 | Burkhardt |
| 5,362,280 A | 11/1994 | Hirai et al. |
| 5,566,795 A | 10/1996 | Barefoot |
| 5,680,032 A | 10/1997 | Pena |
| 5,920,127 A | 7/1999 | Damron et al. |
| 5,921,334 A | 7/1999 | Al-Dokhi |
| 5,927,094 A | 7/1999 | Nickum |
| 6,076,516 A | 6/2000 | Tucker |
| 6,474,242 B1 | 11/2002 | Baier |
| 6,897,575 B1 | 5/2005 | Yu |
| 7,478,693 B1 | 1/2009 | Curtis |
| 7,653,464 B1 | 1/2010 | Mitra |
| 7,763,988 B1 | 7/2010 | Dravis |
| 8,098,040 B1 | 1/2012 | Botto |
| 8,371,401 B1 | 2/2013 | Illustrato |
| 8,436,485 B1 | 5/2013 | Smith |
| 8,509,992 B1 | 8/2013 | Bosworth |
| 8,513,828 B1 | 8/2013 | Ripley |
| 8,701,804 B1 | 4/2014 | Antrobus |
| 2002/0066608 A1 | 6/2002 | Guenard et al. |
| 2002/0153178 A1 | 10/2002 | Limonius |
| 2002/0187033 A1 | 12/2002 | Stahler |
| 2003/0209370 A1 | 11/2003 | Maberry |
| 2004/0080227 A1* | 4/2004 | Tung Kong et al. .......... 310/112 |
| 2005/0046195 A1 | 3/2005 | Kousoulis |
| 2005/0210858 A1 | 9/2005 | Gore et al. |
| 2006/0047398 A1 | 3/2006 | Abe et al. |
| 2006/0213697 A1 | 9/2006 | Sutherland |
| 2006/0273596 A1 | 12/2006 | Durbin |
| 2007/0077967 A1 | 4/2007 | Nicholls et al. |
| 2007/0126238 A1 | 6/2007 | Augusto |
| 2007/0296222 A1* | 12/2007 | Blackman ................ 290/1 A |
| 2008/0041643 A1 | 2/2008 | Khalife |
| 2008/0202825 A1 | 8/2008 | Kerish |
| 2008/0231052 A1 | 9/2008 | Farmer |
| 2008/0257614 A1 | 10/2008 | Tabe |
| 2008/0263731 A1 | 10/2008 | Tabe |
| 2009/0181609 A1 | 7/2009 | Thomas |
| 2009/0267348 A1 | 10/2009 | Liebermann |
| 2009/0301796 A1 | 12/2009 | Wedderburn et al. |
| 2010/0087976 A1 | 4/2010 | Aridome et al. |
| 2010/0107994 A1 | 5/2010 | Moriarty et al. |
| 2010/0140006 A1 | 6/2010 | Frierman |
| 2010/0167602 A1 | 7/2010 | Vu |
| 2010/0237627 A1 | 9/2010 | Socolove et al. |
| 2010/0270810 A1 | 10/2010 | Liebermann |
| 2010/0315040 A1 | 12/2010 | Sakurai |
| 2011/0101698 A1 | 5/2011 | Saluccio |
| 2011/0156404 A1 | 6/2011 | Haddad |
| 2011/0162924 A1 | 7/2011 | Laxhuber |
| 2011/0198856 A1 | 8/2011 | Ling |
| 2011/0248666 A1 | 10/2011 | Lorenson |
| 2011/0260470 A1 | 10/2011 | Ahmadi |
| 2011/0266075 A1 | 11/2011 | Guzelimian |
| 2011/0309786 A1 | 12/2011 | Hassan |
| 2012/0085587 A1 | 4/2012 | Drouin |
| 2012/0125700 A1 | 5/2012 | Bailey |
| 2012/0132411 A1 | 5/2012 | Park et al. |
| 2012/0133314 A1 | 5/2012 | Kozarekar et al. |
| 2012/0169061 A1 | 7/2012 | Lee et al. |
| 2012/0249065 A1 | 10/2012 | Bissonette et al. |
| 2012/0286513 A1 | 11/2012 | Marano |
| 2012/0298790 A1 | 11/2012 | Bitar |
| 2012/0299526 A1 | 11/2012 | Lambert |
| 2012/0299527 A1 | 11/2012 | Vo |
| 2012/0330488 A1 | 12/2012 | Sadler |
| 2013/0009469 A1 | 1/2013 | Gillett |
| 2013/0026989 A1 | 1/2013 | Gibbs et al. |
| 2013/0043082 A1 | 2/2013 | Tran |
| 2013/0063071 A1 | 3/2013 | Walters |
| 2013/0127393 A1 | 5/2013 | Garcia |
| 2013/0168962 A1 | 7/2013 | Bruno |
| 2013/0175954 A1 | 7/2013 | Astigarraga et al. |
| 2013/0175974 A1 | 7/2013 | Bassham et al. |
| 2013/0184916 A1 | 7/2013 | Goodwin |
| 2013/0289809 A1 | 10/2013 | Treharne et al. |
| 2013/0306389 A1 | 11/2013 | Penev |
| 2013/0314023 A1 | 11/2013 | Collier |
| 2013/0328318 A1 | 12/2013 | Ozawa |
| 2014/0076641 A1 | 3/2014 | Penev |

* cited by examiner

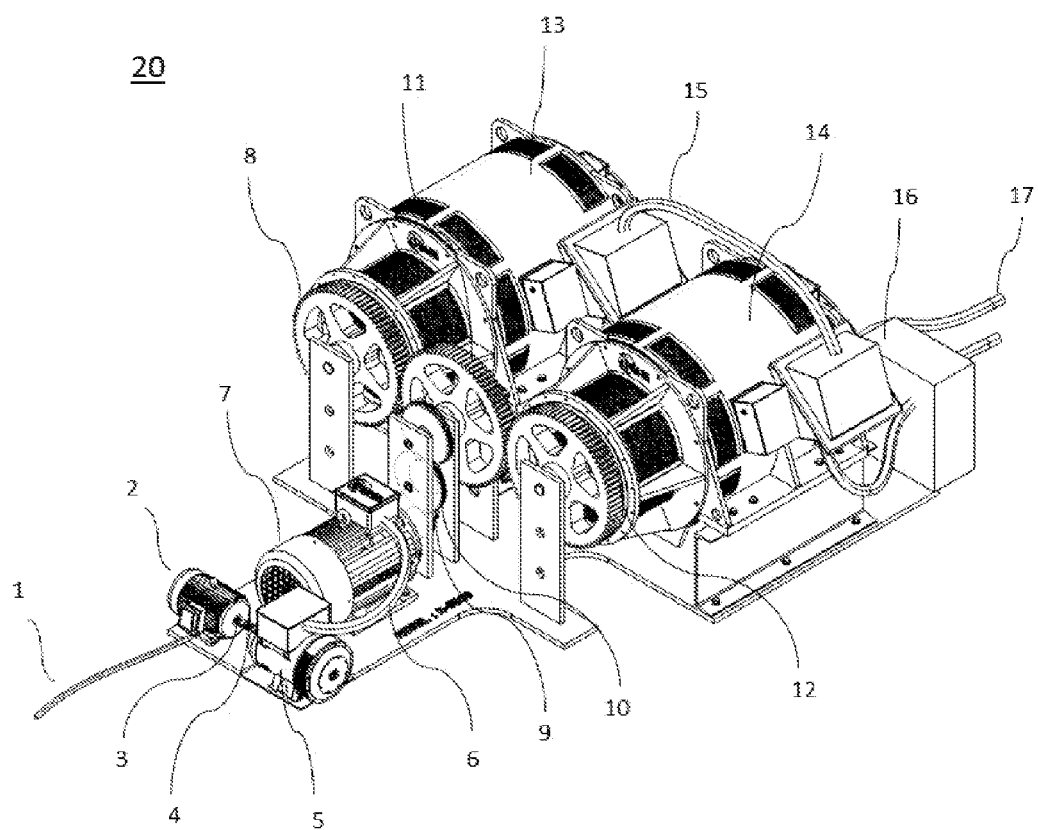

APPARATUS WITH POWER GENERATORS DRIVEN BY ELECTRIC MOTORS

BACKGROUND OF THE INVENTION

One or more embodiments of the present invention relate to an apparatus provided with electric power generators. The apparatus includes an electric motor that drives a power generator for generating power that is supplied to rotate another electric motor for driving a plurality of power generators.

SUMMARY OF THE INVENTION

An aspect of the present invention provides an apparatus that includes a first electric motor; a first power generator connected to and driven by the first electric motor to generate power; a second electric motor driven by the power generated by the first power generator; a first gear engaged with and driven by the second electric motor; at least one second gear having a larger diameter than that of the first gear, engaged with and driven by the first gear; and a second and a third power generators engaged with the at least one second gear.

In an embodiment of the present invention, the apparatus further includes a center gear engaged with and driven by the at least one second gear, wherein each of the first and second power generators is engaged with and driven by the center gear.

In an embodiment of the present invention, wherein each of the second and third power generators includes a gear shaft engaged with and driven by the center gear to generate electric power.

In an embodiment of the present invention, the apparatus further includes a first base and a second base, wherein the first electric motor, the first power generator and the second electric motor are fixed to the first base, and the second and third power generators are fixed to the second base.

In an embodiment of the present invention, the first electric motor is connected to the first power generator through a jointer.

In an embodiment of the present invention, the apparatus includes a first electric wire for connecting the first power generator and the second electric motor to supply the power generated by the first power generator to the second electric motor.

In an embodiment of the present invention, the second and third power generators are located in parallel with one another and connected through a second electric wire.

In an embodiment of the present invention, one of the second or third power generators is connected to a power transformer to supply the power generated by the second and third power generators to a grid or to the first electric motor.

In an embodiment of the present invention, the second and third generators rotate at the same RPM.

BRIEF DESCRIPTION OF THE DRAWINGS

These and other aspects will become apparent and more readily appreciated from the following description of the embodiments, taken in conjunction with the accompanying drawings of which:

FIG. 1 is a perspective view of an apparatus of the present invention.

The features and advantages of the present invention will become more apparent from the detailed description set forth below when taken in conjunction with the drawings in which like reference numbers indicate identical or functionally similar elements.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second, and the like may be used to describe various elements, but do not limit the elements. Such terms are only used to classify one element from another.

These and/or other aspects will become apparent and more readily appreciated from the following description of embodiments of the present invention, taken in conjunction with the accompanying drawing.

An aspect of the present invention provides an apparatus (20) that includes a first electric motor (2); a first power generator (5) connected to and driven by the first electric motor (2) to generate power; a second electric motor (7) driven by the power generated by the first power generator (5); a first gear (9) engaged with and driven by the second electric motor (7); at least one second gear (10) having a larger diameter than that of the first gear (9), engaged with and driven by the first gear (9); a second and a third power generators (13, 14) engaged with the at least one second gear (10). The first electric motor (2) is driven by electric power, being connected to AC or DC power through a connector wire (1), and may have a rotating shaft (3) that drives the first power generator (5). The rotating shaft (5) may be connected to a jointer connected to the shaft of the first power generator (5) driven by the first electric motor (2). The first power generator (5) generates power supplied to the second electric motor (7) which in turn rotates the first gear (9). The first gear (9) may be an integral part of the shaft of the second electric motor (7) or a separate part engaged with the second electric motor (7). The first gear (9) may be engaged with the at least one second gear (10) which has a larger diameter than that of the first gear (9). In a preferred embodiment, there may be two second gears (10), one having a larger diameter than that of the other and which are intermediate gears connecting the second electric motor (7) with the second and third power generators (13, 14).

In another preferred embodiment of the present invention, the first or second electric motors (2, 7) may be provided with a pulley, and the first, second and third power generators (5, 13, 14) may be provided with another pulley, so that the power generators (5, 13, 14) may be driven by the electric motors (2, 7) through a belt connecting with the pulleys.

In another embodiment of the present invention, the second electric motor (7) may be provided with a chain gear engaging with directly the second and third power generators (13, 14) having another chain gear through a chain belt.

In a preferred embodiment of the present invention, the apparatus (20) further includes a center gear (11) engaged with and driven by the at least one second gear (10), wherein each of the second and third power generators (13, 14) has a gear shaft (8, 12) engaged with and driven by the center gear (11) to generate electric power. The center gear (11) may have the same diameter as the gear shaft (8, 12) of the second and third power generators (13, 14) and engages with both the second and third power generators (13, 14), being located therebetween as shown in FIG. 1, such that the RPM of the second and third power generators is at the same rate. In a different embodiment of the present invention, the second power generator (7) may be engaged with the second and third power generators (13, 14) through the center gear (11).

In an embodiment of the present invention, the apparatus (20) further includes a first base and a second base, wherein the first electric motor (2), the first power generator (5) and the second electric motor (7) are fixed to the first base, and the second and third power generators (23, 14) are fixed to the second base.

In an embodiment of the present invention, the first electric motor (2) is connected to the first power generator (5) through a jointer (4).

In an embodiment of the present invention, the apparatus (20) includes a first electric wire (6) for connecting the first power generator (5) and the second electric motor (7) to supply the power generated by the first power generator (5) to the second electric motor (7).

In an embodiment of the present invention, the second and third power generators (13, 14) are located in parallel with one another and connected through a second electric wire (15).

In an embodiment of the present invention, one of the second or third power generators (13, 14) is connected to a power transformer (16) to supply the power generated by the second and third power generators (13, 14) to a grid (17) or to the first electric motor (2).

In a preferred embodiment of the present invention, the second and third generators (13, 14) rotate at the same RPM, for example at 1,800 RPM, having capacity of generating 400 kW.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An apparatus comprising:
   at least one electric motor provided with one of a gear or a pulley; and
   at least one power generator provided with one of another gear or another pulley engaging with the gear or the pulley, wherein the at least one electric motor drives the at least one power generator and the at least one electric motor rotates at the same speed with the at least one power generator,
   wherein the at least one electric motor comprises a first electric motor, and the at least one power generator comprises a first power generator connected to and driven by the first electric motor to generate power, the apparatus further comprising:
   a second electric motor driven by the power generated by the first power generator;
   a first gear engaged with and driven by the second electric motor;
   at least one second gear having a larger diameter than that of the first gear, engaged with and driven by the first gear;
   a second and a third power generators engaged with the at least one second gear.

2. The apparatus of claim 1, wherein each of the gears of the at least one electric motor and the at least one power generator is a chain gear, being connected with one another through a chain.

3. The apparatus of claim 1, wherein the pulleys of the at least one electric motor and the at least one power generator are connected with one another through a belt.

4. The apparatus of claim 1, further comprising a center gear engaged with and driven by the at least one second gear, wherein each of the first and second power generators is engaged with and driven by the center gear.

5. The apparatus of claim 4, wherein each of the first and second power generators includes a gear shaft engaged with and driven by the center gear to generate electric power.

6. The apparatus of claim 1, wherein the first electric motor is connected to the first power generator through a jointer.

7. The apparatus of claim 1, further comprising a first electric wire for connecting the first power generator and the second electric motor to supply the power generated by the first power generator to the second electric motor.

8. The apparatus of claim 1, wherein the second and third power generators are located in parallel with one another and connected through a second electric wire.

9. The apparatus of claim 8, wherein one of the second or third power generator is connected to a power transformer to supply the power generated by the second and third power generators to a grid or to the first electric motor.

10. The apparatus of claim 1, wherein the second and third generators rotate at the same RPM.

* * * * *